(12) United States Patent
Chang et al.

(10) Patent No.: US 12,082,090 B2
(45) Date of Patent: Sep. 3, 2024

(54) NARROWBAND REFERENCE SIGNAL TRANSMISSION FOR MEASUREMENT AND SYNCHRONIZATION

(71) Applicant: Apple Inc., Cupertino, CA (US)

(72) Inventors: Wenting Chang, Beijing (CN);
Huaning Niu, San Jose, CA (US);
Salvatore Talarico, Sunnyvale, CA (US); Qiaoyang Ye, San Jose, CA (US);
Rongrong Sun, Beijing (CN)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 17/264,685

(22) PCT Filed: Jul. 31, 2019

(86) PCT No.: PCT/US2019/044383
§ 371 (c)(1),
(2) Date: Jan. 29, 2021

(87) PCT Pub. No.: WO2020/028510
PCT Pub. Date: Feb. 6, 2020

(65) Prior Publication Data
US 2021/0306834 A1    Sep. 30, 2021

Related U.S. Application Data

(60) Provisional application No. 62/713,380, filed on Aug. 1, 2018.

(51) Int. Cl.
*H04W 4/80*      (2018.01)
*H04L 5/00*      (2006.01)
(Continued)

(52) U.S. Cl.
CPC ............. *H04W 4/80* (2018.02); *H04L 5/0012* (2013.01); *H04L 5/0051* (2013.01);
(Continued)

(58) Field of Classification Search
CPC ... H04W 4/80; H04W 72/23; H04W 72/0446; H04W 72/0473; H04L 5/0012; H04L 5/0051; H04L 27/2614
See application file for complete search history.

(56) References Cited

U.S. PATENT DOCUMENTS 10,505,778 B2   12/2019  Kim et al.
2012/0250749 A1  10/2012  Tadano
(Continued)

FOREIGN PATENT DOCUMENTS

CN       108207029 A     6/2018
KR   10-2018-0057635 A   5/2018
(Continued)

OTHER PUBLICATIONS

International Search Report and Written Opinion directed to related International Patent Application No. PCT/US2019/044383, mailed Nov. 27, 2019; 9 pages.

(Continued)

*Primary Examiner* — Jael M Ulysse
(74) *Attorney, Agent, or Firm* — Sterne, Kessler, Goldstein & Fox P.L.L.C.

(57) ABSTRACT

Embodiments of the present disclosure provide for narrowband reference signals transmission. A base station is configured to: generate downlink transmissions for unlicensed Internet of things (U-IoT) communication, the downlink transmissions to include an anchor segment on a first plurality of subframes and a data segment on a second plurality of subframes, wherein the anchor segment includes a narrowband reference signal (NRS) configured to be transmitted at a first transmit power by the base station, to facilitate time or frequency tracking and cause transmission of the downlink frame for the U-IoT communication. And a user equipment is configured to receive the NRSs transmitted by (Continued)

the base station and process transmissions based on reception of the NRSs.

20 Claims, 10 Drawing Sheets

(51) Int. Cl.
    *H04L 27/26*     (2006.01)
    *H04W 72/044*     (2023.01)
    *H04W 72/0446*     (2023.01)
    *H04W 72/23*     (2023.01)

(52) U.S. Cl.
    CPC ..... *H04L 27/2614* (2013.01); *H04W 72/0446* (2013.01); *H04W 72/0473* (2013.01); *H04W 72/23* (2023.01)

(56) References Cited

U.S. PATENT DOCUMENTS

| | | | |
|---|---|---|---|
| 2017/0094621 A1 | 3/2017 | Xu et al. | |
| 2017/0201393 A1* | 7/2017 | Gaal | H04L 5/0048 |
| 2017/0208592 A1 | 7/2017 | Rico Alvarino et al. | |
| 2017/0238292 A1 | 8/2017 | Rico Alvarino et al. | |
| 2017/0265171 A1* | 9/2017 | Rico Alvarino | H04L 5/0048 |
| 2017/0359820 A1* | 12/2017 | Gaal | H04L 5/005 |
| 2018/0020452 A1* | 1/2018 | Yerramalli | H04W 72/0453 |
| 2018/0062698 A1 | 3/2018 | Wang et al. | |
| 2018/0069589 A1 | 3/2018 | Liu et al. | |
| 2018/0124644 A1 | 5/2018 | Rico Alvarino et al. | |
| 2019/0045372 A1* | 2/2019 | Niu | H04W 56/0015 |
| 2019/0053064 A1* | 2/2019 | Niu | H04L 5/00 |
| 2019/0090149 A1* | 3/2019 | Liu | H04W 16/14 |
| 2019/0173521 A1* | 6/2019 | Liu | H04L 5/0098 |
| 2019/0181995 A1* | 6/2019 | Liu | H04W 72/23 |
| 2019/0313481 A1* | 10/2019 | Niu | H04W 72/0446 |
| 2019/0320250 A1* | 10/2019 | Hoole | H04L 5/0007 |
| 2019/0327047 A1* | 10/2019 | Liu | H04L 27/2613 |
| 2019/0394740 A1* | 12/2019 | Menon | H04L 67/12 |
| 2020/0112955 A1* | 4/2020 | Somichetty | H04L 1/1819 |
| 2020/0153582 A1* | 5/2020 | Ji | H04L 5/0007 |
| 2020/0169955 A1* | 5/2020 | Chang | H04L 5/001 |
| 2020/0314874 A1* | 10/2020 | Li | H04W 4/80 |
| 2020/0322200 A9* | 10/2020 | Hwang | H04L 5/22 |
| 2020/0328777 A1* | 10/2020 | Liu | H04B 1/7136 |

FOREIGN PATENT DOCUMENTS

| | | |
|---|---|---|
| WO | WO 2017/078783 A1 | 5/2017 |
| WO | WO 2017133550 A1 | 8/2017 |
| WO | WO 2018/031620 A1 | 2/2018 |
| WO | WO 2018/057600 A1 | 3/2018 |
| WO | WO 2018/064525 A1 | 4/2018 |
| WO | WO 2018/084644 A1 | 5/2018 |

OTHER PUBLICATIONS

Chinese Office Action directed to related Chinese Application No. 2019800510185, mailed Jul. 29, 2023, with English-language translation of the Search Report attached; 16 pages.

Second Chinese Office Action and Search Report directed to related Chinese Application No. 201980051018.5, with English-language translation of the Search Report attached, issued Jan. 10, 2024; 13 pages.

* cited by examiner

NARROWBAND REFERENCE SIGNAL TRANSMISSION FOR MEASUREMENT AND SYNCHRONIZATION

CROSS REFERENCE TO RELATED APPLICATION

The present application is a National Stage entry from PCT/US2019/044383 filed on Jul. 31, 2019, entitled "Narrowband Reference Signal Transmission for Measurement and Synchronization", which claims priority to U.S. Provisional Patent Application No. 62/713,380, filed Aug. 1, 2018, entitled "Narrowband Reference Signal (NRS) Transmission for Radio Resource Management (RRM) Measurement and Synchronization Correlation" which are incorporated herein by reference in their entireties.

FIELD

Embodiments of the present invention relate generally to the technical field of wireless communications.

BACKGROUND

The Internet of Things (IOT) is a concept in which a large number of computing devices are interconnected to each other and to the Internet to provide functionality and data acquisition at relatively low levels. IoT is envisioned as a significantly important technology component, which has huge potential, and may change our daily life entirely by enabling connectivity between a large number of devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
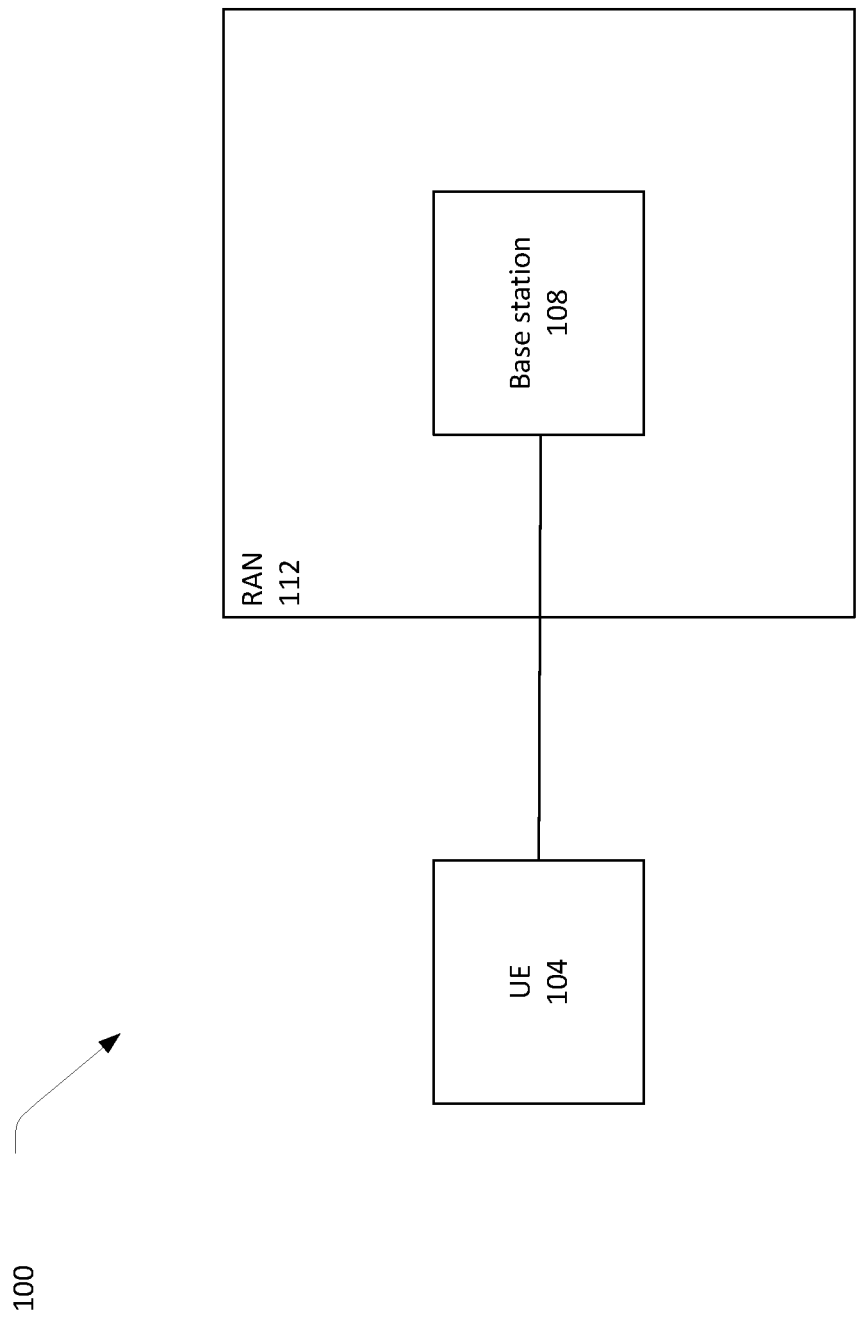
FIG. 1 illustrates a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

An IoT device (also referred to as a "Machine-Type Communication device" or "MTC device") may include an autonomous or semiautonomous device that performs one or more functions, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like. IoT devices (or groups of IoT devices) may be accessible through remote computers, servers, and other systems, for example, to control systems or access data. A group or set of IoT devices that are connected to one another using wired or wireless technologies may be referred to as a "network of IoT devices," an "IoT network," or the like.

Networks of IoT devices may be used for a wide variety of applications in various deployment scenarios, including commercial and home automation, smart factories or smart manufacturing, smart cities, smart environment, smart agriculture, and smart health systems. For example, IoT networks may be used for water distribution systems, electric power distribution systems, pipeline control systems, plant control systems, light switches, thermostats, locks, cameras, alarms, motion sensors, and the like.

Third Generation Partnership Project (3GPP) has standardized two designs to support IoT services—enhanced Machine Type Communication (eMTC) and Narrow Band IoT (NB-IOT). As eMTC and NB-IOT UEs will be deployed in huge numbers, lowering the cost of these UEs is a key enabler for implementation of IoT. Also, low power consumption is desirable to extend the lifetime of the battery. In addition, there are substantial use cases of devices deployed deep inside buildings, which would require coverage enhancement in comparison to the defined LTE cell coverage footprint. For these reasons, eMTC, and NB-IOT techniques are designed to ensure that the UEs have low cost, low power consumption, and enhanced coverage.

Both Release (Rel)-13 eMTC and NB-IOT operate in licensed spectrum. On the other hand, the scarcity of licensed spectrum in low frequency bands results in a deficit in the data rate boost. Thus, there are emerging interests in the operation of Long Term Evolution (LTE) systems in unlicensed spectrum.

Potential LTE operation in unlicensed spectrum includes, but is not limited to the Carrier Aggregation based on Licensed Assisted Access (LAA)/enhanced LAA (eLAA) systems, LTE operation in the unlicensed spectrum via dual connectivity (DC), and the standalone LTE system in the unlicensed spectrum. A standalone system may be a Multi-Fire® (MF) system, which is an LTE-based technology that solely operates in unlicensed spectrum without requiring an "anchor" in a licensed spectrum. In some embodiments, the UE 104 and the RAN 108 may be compatible with a Multi-Fire® (MF) Release 1.1 Specification (December 2018) or any updates thereto.

FIG. 1 illustrates a standalone network 100 in accordance with some embodiments. In general, the components shown in the standalone network 100 may be similar to, and substantially interchangeable with, like-named components in other figures described herein. The network 100 may include a UE 104 to communicate with a base station 108 of a radio access network (RAN) 112 using one or more radio access technologies in an unlicensed and shared spectrum. The UE 104 may be an NB-IOT device designed to operate on a subset of a system bandwidth. Thus, various embodiments may be related to unlicensed IoT (U-IOT) systems that focus on NB-IOT-based designs.

The radio access technologies may be a standalone technology compatible with, for example, any of the MultiFire® specifications, for example, MultiFire® Release 1.1 or any updates thereto.

The base station 108 may be referred to as access point, access node, evolved node B (eNB), next generation node B (gNB), transmit/receive point (TRP), etc. The base station 108 may provide an NB-IOT cell in an unlicensed spectrum (for example, an MF NB-IOT cell).

Figure 2:
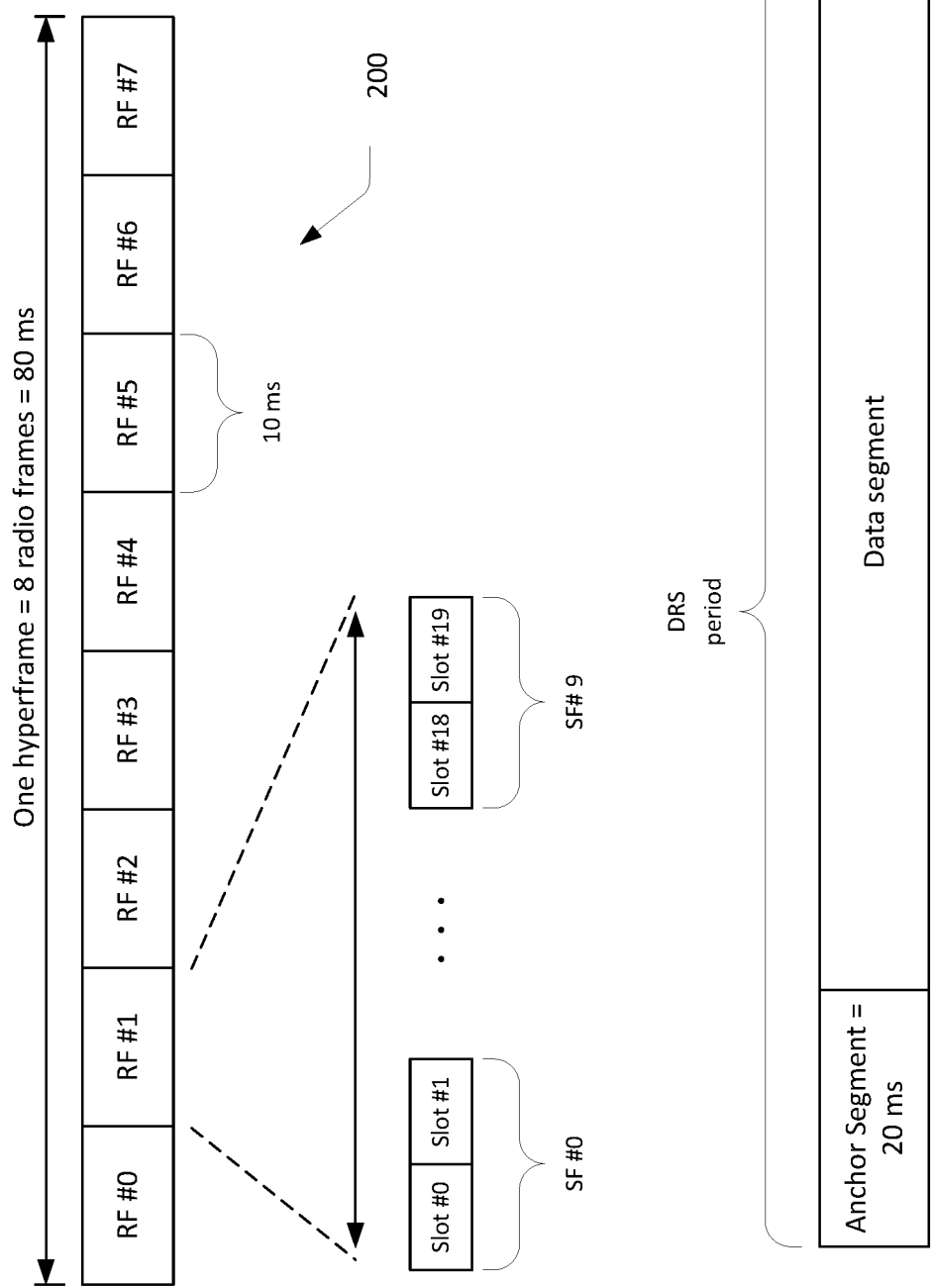
FIG. 2A illustrates a hyperframe and FIG. 2B illustrates a discovery reference signal period in accordance with some embodiments.

FIG. 2A illustrates an hyperframe 200 for communication between the UE 104 and the base station 108. In some embodiments, the hyperframe 200 may have a frame structure applicable to MF NB-IOT cells with normal cyclic prefix. The hyperframe 200 may include 8 radio frames (RFs), RF #0-RF #7, with each radio frame being 10 ms long. In other embodiments, the hyperframe 200 may include different numbers of RFs, for example, 2 RFs or 4 RFs.

Each radio frame may include 20 slots, slot #0-slot #19, with each slot having a length of 0.5 ms. A subframe may be defined as two consecutive slots. Thus, each radio frame may include ten subframes, SF #0-SF #9.

FIG. 2B illustrates a DRS period 204 partitioned into an anchor segment 208 and a data segment 212. A DRS period may have a length of 8 or 128 radio frames. The anchor segment 208 may include two radio frames, while the data segment 212 includes the remaining radio frames of the DRS period.

The anchor segment may include downlink transmissions such as narrow band primary synchronization signal (NPSS), narrow band secondary synchronization signal (NSSS), and narrow band physical broadcast channel (NPBCH).

The data segment may include uplink or downlink transmissions such as narrow band physical uplink shared channel (NPUSCH), narrow band physical random access channel (NPRACH), narrow band physical downlink control channel (NPDCCH), and narrow band physical downlink shared channel (NPDSCH).

Figure 3:
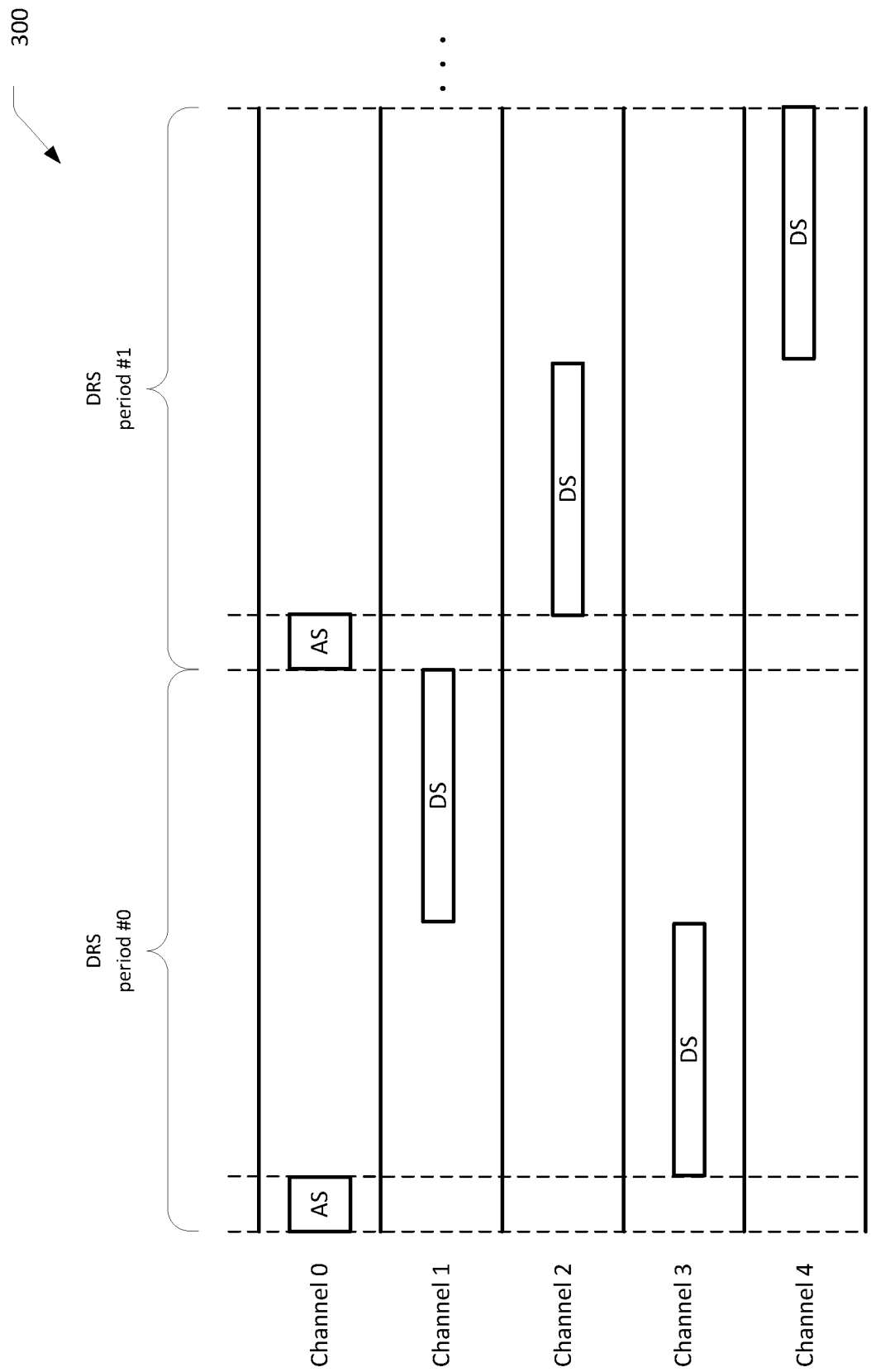
FIG. 3 illustrates transmission of data segments using frequency hopping in accordance with some embodiments.

FIG. 3 illustrates a frequency hopping embodiment over a plurality of DRS periods in accordance with some embodiments. The anchor segment may be transmitted on an anchor channel, channel 0, while the data segments may be transmitted on non-anchor channels, for example, channels 1-4. All the channels may be in the unlicensed spectrum.

In this embodiment, a first data segment of DRS period 0 is transmitted on channel 3, and a second data segment of DRS period #0 is transmitted on channel 1. In DRS period 1, the anchor segment remains in the anchor channel, channel 0), while the data segments hop between other non-anchor channels, for example, channel 2 and channel 4. In other embodiments, more or less data segments may be transmitted per DRS period; and more or less channels may be used.

In the United States (US), the anchor segment may be three resource blocks while the data segments may be one resource block. In the European Union (EU), both the anchor segments and the data segments may be one resource block.

The target band for narrow band unlicensed IoT may be the sub-1 GHz band for the US, EU, and China. However, the embodiments herein may be applicable to other frequency bands. Regulation defines the operation of such a system for either digital modulation or frequency hopping. Digital modulation requires system bandwidth greater than 500 KHz with a power spectral density (PSD) limitation of 8 dBm/3 kHz. Restrictions on frequency hopping include limitations on the duty cycle and the number of hops. Different number of hops result in different maximum transmission power. In the EU, for this specific band four new sub-channels have been proposed to be used. These sub-channels are: 865.6 MHz~865.8 MHz, 866.2 MHz~866.4 MHz, 866.8 MHz~867.0 MHz, 867.4 MHz~867.6 MHz. In the EU, the regulation regarding these sub-channels states that: 1) maximum equivalent isotropically radiated power (EIRP) is 27 dBm: 2) adaptive power control is required: 3) bandwidth is smaller than 200 KHz: 4) the duty cycle for network access points is smaller than 10%, otherwise this is 2.5% for other types of equipment. While operating an NB-IOT system in this band as a digital modulation system is appealing, operating as a frequency hopping system provides more benefits. For example, frequency hopping may exploit frequency diversity even though the initial access timing might be longer. More importantly, digital modulation with 3 resource blocks (RBs) has the same transmit power as frequency hopping with 1 RB, which translates in a loss in terms of coverage of about ~5 dB.

For NB-IOT operation, the base station 108 may transmit a cell specific reference (CRS) signal called narrow band CRS or narrow band reference signal (NRS). In either frequency division duplexing (FDD) or time division duplexing (TDD) NB-IOT system, the base station 108 may transmit the NRS for the UE 104 to perform radio resource management (RRM) measurement and frequency error correction. The NRS may be transmitted on both a non-anchor carrier and an anchor carrier. This may allow the UE 104 to perform cross-subframe channel estimation for master information block (MIB)/system information block (SIB) detection. In some instances, a minimum set of subframes (SFs) in which the NRS may be transmitted may be defined to help the UE 104 efficiently perform frequency/time tracking and measurements. For TDD, the set of SFs may not always be DL SFs. Thus, various aspects of this disclosure provide designs on NRS transmission for TDD NB-IOT-U system to address these situations.

This disclosure provides design details of NRS transmission for RRM measurement and synchronization correction in NB-IoT-U. Described operation may pass regulation tests and enhance the RRM measurement and synchronization correlation.

In the legacy NB-IOT systems, the assumption is that that NRS is always transmitted from the UE's point of view. These NRS transmissions are performed on both the non-anchor and anchor carrier, and they help cross-SF channel estimation for MIB/SIB detection. However, by defining a minimum set of SFs where the NRS are transmitted can help the UE to perform frequency/time tracking and measurements.

For TDD, the SFs may not always be DL SFs. Thus, the following assumptions may be made.

On an anchor carrier, before obtaining the operation mode information (MIB-NB), the UE 104 may assume NRSs are transmitted in SF #9 and SF #0 not containing the NSSS.

On an anchor carrier for SIB1-NB, before the UE 104 obtains SIB1-NB, the UE 104 may assume NRSs are transmitted in SF #0 not containing NSSS, SF #9, and SF #4 if SF #4 is configured for SIB1-NB transmission. After the UE 104 obtains SIB1-NB, the UE 104 may assume NRS are also transmitted in any other valid DL subframe, including a special subframe in which NRS is supported On a non-anchor carrier for SIB1-NB, the UE 104 may assume NRS are transmitted in SF #0 and SF #5 before the UE 104 obtains SIB1-NB.

TDD downlink (DL)/uplink (UL) configurations for the NB-IOT-U may be as follows.

In the US, which may be under jurisdiction of the Federal Communication Commission (FCC), the DL/UL configurations may include: 10 DL+10 UL; 14 DL+6 UL; 4 DL+6 UL+4 DL+6 UL; 6 DL+14 UL; 8 DL+12 UL; 12 DL+8 UL; 6 DL+4 UL+6 DL+4 UL; and 18 DL+2 UL.

In the EU, the DL/UL configurations may include: 8 DL+72 UL; 4 DL+36 UL; and 2 DL+18 UL.

In various embodiments, the always-on NRS may be transmitted in the first N DL subframes, where N can be, for example, 1/2/3/4 or higher. Thus, per 20 ms dwell, there may be 1/2/3/4 or more than 4 DL subframes at the beginning will transmit the always-on NRS. As used herein, a "dwell" may be the amount of time that the UE 104 may be configured to communicate on one channel before moving to another.

In various embodiments, for the anchor carrier, after the UE 104 acquires NPBCH information, there may be SIB1 configuration and DL/UL configuration, and the UE 104 may operate according to at least one of the following options.

In a first option, besides the first N DL subframes, the UE 104 may assume always-on NRS is also transmitted in subframes used for SIB1 transmission.

In a second option, the UE 104 may assume always-on NRS is transmitted in all valid DL subframes.

In a third option, the UE 104 may assume always-on NRS is transmitted at the beginning of 2/4/6/8 subframes of the DL/UL period. Here, different DL/UL configuration can have different SFs for which NRS is transmitted. For instance, for 4DL+6UL+4DL+6DL, the always-on NRS may be transmitted in the first 4 DL subframes per dwell. While for configuration 10 DL+10 UL, the always-on NRS may be transmitted in the first 8 DL subframes.

In a fourth option, the UE 104 may assume the NRS is transmitted in the odd DL SFs or in the even DL subframes regardless of the DL/UL configuration.

In a fifth option, the UE 104 may assume the NRS is transmitted in the first N odd or N even SFs, where N is for example 2, 3 or higher. In one embodiment, the value of N depends upon the DL/UL configuration.

In various embodiments, there may be no default NRS transmission. In such embodiments, the UE 104 may assume the NRS is transmitted on the 10 SFs of PBCH. After reading the SIB1 configuration from MIB, the UE 104 may assume the NRS is transmitted on the DL subframes containing SIB1, as well as 10 SFs of PBCH. After reading the SIB-x configuration from SIB1, the UE may assume NRS is transmitted on the DL subframes containing SIB-x, as well as SIB1 DL SFs, 10 SFs of PBCH.

In various embodiments, there may be no guaranteed NRS DL subframes, which means if there is no DL data transmission, there is no NRS transmission.

In various embodiments, different regions can have different SFs where always-on NRS may be configured to be transmitted.

In various embodiments, in the EU, before obtaining the PBCH information, the minimum DL subframe number may be 2 DLs among all DL/UL configuration, and the maximum period may be 80 ms. So the UE 104 can assume that the NRSs are always on the first two DL subframes per 80 ms.

In various embodiments, in the EU, after obtaining the PBCH information, one of the following options may be chosen.

In a first option, besides the by-default subframes, the UE 104 may assume the NRS is also transmitted in the subframe used for the SIB1 transmission.

In a second option, the UE 104 may assume the always-on NRS is transmitted in all valid DL subframes.

In a third option, the UE 104 may assume the always-on NRS is always transmitted at the beginning of 2/4/8 subframes per DL/UL period. Here, different DL/UL configuration can have different subframes in which the always-on NRSs transmitted. For instance, for 8DL+72UL, the always-on NRS may be transmitted in the first 4 DL subframes of each dwell. While for configuration 2DL+18 UL, the always-on NRS may be transmitted in the first 2 DL subframes.

In a fourth option, the UE 104 may assume the NRS is transmitted in the odd DL SFs or in the even DL subframes regardless of the DL/UL configuration.

In a fifth option, the UE 104 may assume the NRS is transmitted in the first N odd or N even SFs, where N is for example 2, 3, or higher. In one embodiment, the value of N depends upon the DL/UL configuration.

In various embodiments, after obtaining the other SIB scheduling information from the SIB1, the always on NRS can be transmitted using one of the following options.

In a first option, besides the by-default subframes, the UE 104 can assume the always-on NRS can be transmitted at all SIB subframes, e.g. SIB1, SIBx (for example, another SIB besides SIB1).

In a second option, the UE 104 can assume the always-on NRS can be transmitted at all valid DL subframes.

In a third option, the UE 104 can assume always-on NRS can be transmitted at the beginning of 2/4/8 subframes per DL/UL period.

In a fourth option, the UE 104 may assume the NRS is transmitted in the odd DL SFs or in the even DL subframes regardless of the DL/UL configuration.

In a fifth option, the UE 104 may assume the NRS is transmitted in the first N odd or N even SFs, where N is for example 2,3 or higher. In one embodiment, the value of N depends upon the DL/UL configuration.

In various embodiments, in the FCC, before obtaining the PBCH information, the minimum DL subframe number is 4

DLs among all DL/UL configurations, and the maximum period is 20 ms, so the UE 104 can assume that NRS are always on the first 4 DL subframes per 20 ms.

In various embodiments, in the FCC, after obtaining the PBCH information, one of the following options may be chosen.

In a first option, besides the by default subframes, the UE assumes always-on NRS is also transmitted in those subframes used for the SIB1 transmission.

In a second option, the UE 104 may assume the always-on NRS is transmitted in all valid DL subframes In a third option, the UE 104 may assume the always-on NRS is always transmitted at the beginning of 2/4/6/8 subframes of the DL/UL period. Here, different DL/UL configuration can have different SFS for which NRS is transmitted. For instance, for 4DL+6UL+4DL+6DL, NRS is transmitted in the first 4 DL subframes of each dwell. While for configuration 10 DL+10 UL, the NRS may be transmitted in the first 8 DL subframes.

In a fourth option, the UE 104 may assume the NRS is transmitted in the odd DL SFs or in the even DL subframes regardless of the DL/UL configuration.

In a fifth option, the UE may assume the NRS is transmitted in the first N odd or N even SFs, where N is for example 2,3 or higher. In one embodiment, the value of N depends upon the DL/UL configuration.

In various embodiments, after obtaining the other SIB scheduling information from SIB1, the always-on NRS may be transmitted based on one of the following options.

In a first option, besides the by-default subframes, the UE 104 may assume the always-on NRS can be transmitted at all SIB subframes, e.g. SIB1, SIBx.

In a second option, the UE 104 may assume the always-on NRS can be transmitted at all valid DL subframes.

In a third option, the UE 104 may assume the always-on NRS can be transmitted at the beginning of 2/4/8 subframes per DL/UL period.

In a fourth option, the UE 104 may assume the NRS is transmitted in the odd DL SFs or in the even DL subframes regardless of the DL/UL configuration.

In a fifth option, the UE 104 may assume the NRS is transmitted in the first N odd or N even SFs, where N is for example 2, 3, or higher. In one embodiment, the value of N depends upon the DL/UL configuration.

In various embodiments, for the primary anchor channel, which contains NPSS/NSSS/NPBCH, the NPBCH subframes may be assumed to transmit always-on NRS for measurement.

In various embodiments, for the secondary anchor channel, which may contain NPSS/NSSS and NPBCH, different assumptions may be made regarding the transmission of the NRS. One assumption may be that if a secondary anchor contains an NPBCH transmission, the NRS is always transmitted in the NPBCH subframes. Another assumption may be that if the secondary anchor does not contain an NPBCH transmission, the UE 104 may assume there is an NRS transmission on this specific channel dwell.

In various embodiments, the always-on NRS may be assumed to be transmitted on every non-anchor carrier.

For the EU, for example, the NRS can be transmitted on 2 DL subframes per each 80 ms in case of multi-carrier (MC) operation.

For the FCC, the NRS can be transmitted on the first 4 DL subframes per each 20 ms dwell. Also in the channel dwell for primary DRS or secondary DRS transmission, the UE 104 can assume that the NRS is always transmitted.

In embodiments, the power of the NRS on the anchor segment, can be configured by the eNB 108. For example, the base station 108 may determine a power to use for transmitting an NRS and may transmit control information to the UE 104 to provide an indication of the determined power. The control information may be transmitted to the UE 104 during an initial configuration or as part of an updated configuration. In some embodiments, the NRS power information may be transmitted in, for example, a SIB. In this manner, the UE 104 may have some preconfigured knowledge about a power at which the NRS is transmitted.

The power determined by the base station 108 may be referenced by energy per resource element (EPRE).

Having the eNB 108 configure the power of the NRS on the anchor segment, as described, may facilitate use of the NRS, by the UE 104, for time/frequency tracking. Thus, the UE 108 may use the received NRS and information about the configured power of the NRS to synchronize reception of downlink communications on a time/frequency basis.

In some embodiments, the power of the NRS on the data channel can be the same as NRS on anchor channel. This situation may be assumed as a default by the UE 104 or it may be expressly configured by the base station 108.

In some embodiments, the base station 108 may detect situations in which it is desirable to boost the NRS. This may be, for example, to enhance a peak-to-average power ratio (PAPR) or for better channel estimation. In these situations, the base station 108 may provide updated NRS power information to the UE 104 as appropriate.

Figure 4:
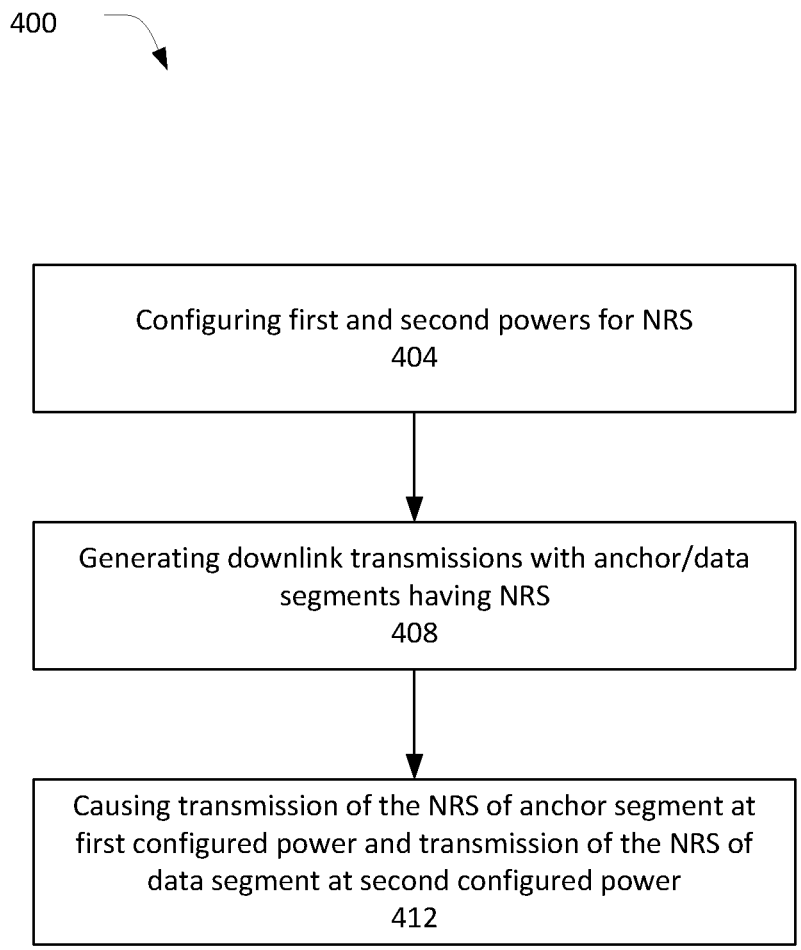
FIG. 4 illustrates an operation flow/algorithmic structure in accordance with some embodiments.

FIG. 4 illustrates an operation flow/algorithmic structure 400 in accordance with some embodiments. The operation flow/algorithmic structure 400 may be performed, in part or in whole, by the base station 108 or components thereof. For example, in some embodiments the operation flow/algorithmic structure 400 may be performed by the baseband circuitry implemented in the base station 108.

The operation flow/algorithmic structure 400 may include, at 404, configuring first and second powers for NRSs. In some embodiments, the configuration of the powers for the NRSs may be based on type of communication, regulatory framework, feedback information (corresponding to channel quality, PAPR, etc.), etc.

The operation flow/algorithmic structure 400 may further include, at 408, generating downlink transmissions with anchor/data segments having NRSs. The downlink transmissions may correspond to a plurality of DRS periods or hyperframe, with each DRS period/hyperframe including one anchor segment and one or more data segments.

The anchor segment may be transmitted on an anchor channel, while the one or more data segments may be transmitted on non-anchor channels. The one or more data segments may be transmitted on the same non-anchor channel, or may be frequency hopped among a plurality of non-anchor channels. The anchor/non-anchor channels may reside in a narrow band subset of a system bandwidth.

The operation flow/algorithmic structure 400 may further include, at 412, causing transmission of the NRSs of the anchor segment at the first configured power and transmission of the NRSs of the data segment(s) at the second configured power.

In some embodiments, the second configured power may be the same as, or at least based on, the first configured power. In other embodiments, the powers of the NRSs of the anchor/data segments may be configured independently of one another.

Figure 5:
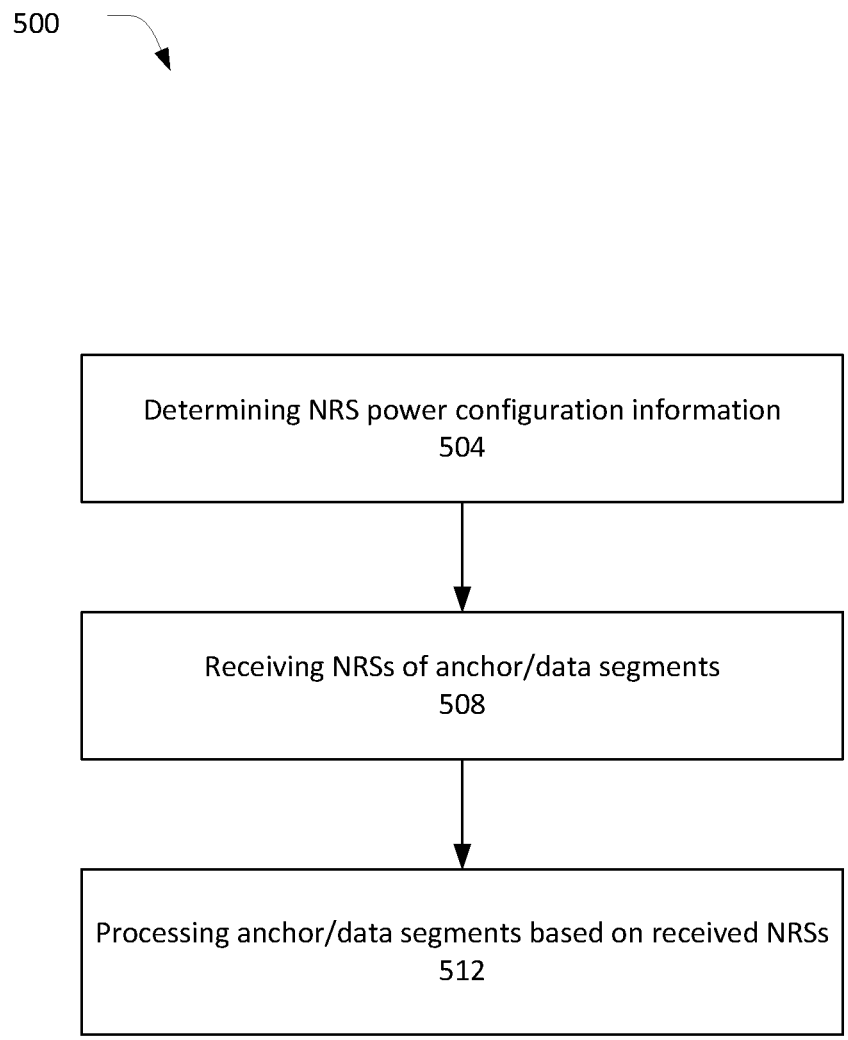
FIG. 5 illustrates an operation flow/algorithmic structure in accordance with some embodiments.

FIG. 5 illustrates an operation flow/algorithmic structure 500 in accordance with some embodiments. The operation flow/algorithmic structure 500 may be performed, in part or in whole, by the UE 104 or components thereof. For example, in some embodiments the operation flow/algorithmic structure 500 may be performed by the baseband circuitry implemented in the UE 104.

The operation flow/algorithmic structure 500 may include, at 504, determining NRS power configuration information. This may be done by the UE 104 accessing power configuration information stored in memory of the UE 104.

In some embodiments, the UE 104 may receive the power configuration information from the base station 108 in, for example, an initial configuration control message, an updated configuration control message, a SIB, etc. In some embodiments, the UE 104 may be preconfigured with the power configuration information.

In some embodiments, the UE 104 may be configured with a default power configuration that the UE 104 may use until more specific, updated power configuration information is provided by the base station 108. For example, the UE 104 may assume that the power of the NRSs on the anchor segment is the same as the power of the NRSs on the data segment unless the base station 108 provides other information.

The operation flow/algorithmic structure 500 may further include, at 508, receiving NRSs of anchor/data segments. The NRSs may be received on the anchor channel and one or more non-anchor channels. The UE 104 may receive and process the NRSs based on the configured power information received at 504.

The operation flow/algorithmic structure 500 may further include, at 512, processing anchor/data segments based on the received NRSs. In some embodiments, the UE 104 may perform time/frequency tracking based on the NRSs, which may facilitate reception (for example, demodulating/decoding) of the resource blocks of the anchor/data segments.

In some embodiments, the UE 104 may process resource blocks received on a first channel based on an NRS received on a second channel if the first and second channels are sufficiently proximate. For example, referring to FIG. 3, if an anchor segment is received on channel 0, and a data segment is received on channel 1, it may be possible for the UE 104 to rely on an NRS of the anchor segment to receive/process the transmission of the data segment. Configuring the NRS of the anchor segment and the data segment with the same transmission power may facilitate use of NRS of one channel for receive processing of another channel.

Figure 6:
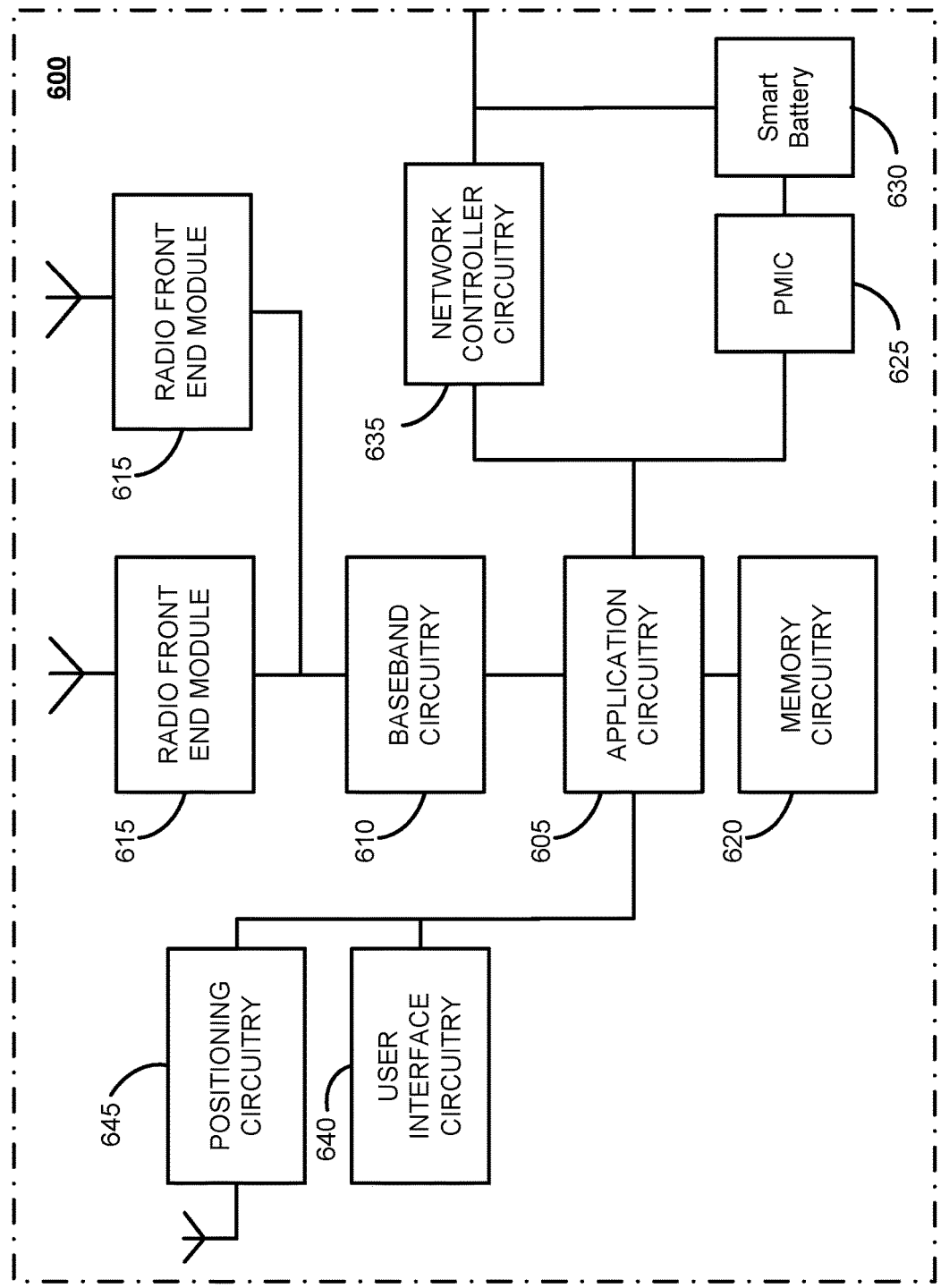
FIG. 6 illustrates an example of infrastructure equipment in accordance with various embodiments.

FIG. 6 illustrates an example of infrastructure equipment 600 in accordance with various embodiments. The infrastructure equipment 600 (or "system 600") may be implemented as a base station, radio head, RAN node, etc., such as base station 108 shown and described previously. The system 600 may include one or more of application circuitry 605, baseband circuitry 610, one or more radio front end modules 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for CRAN, vBBU, or other like implementations).

As used herein, the term "circuitry." may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry." may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 605 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 605 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 600 may not utilize application circuitry 605, and instead may include a special-purpose processor/controller to process IP data received from an EPC or 5GC, for example.

Additionally or alternatively, application circuitry 605 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

User interface circuitry 650) may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel®; and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 may comprise various hardware elements (e.g., including hardware devices such as switches, filters, amplifiers, antenna elements, and the like to facilitate OTA communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 645 and/or positioning circuitry implemented by UE 104, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 645 may include a Micro-Technology for Positioning, Navigation, and Timing (Micro-PNT) integrated circuit (IC) that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 645 may provide data to application circuitry 605 that may include one or more of position data or time data. Application circuitry 605 may use the time data to synchronize operations with other radio base stations (e.g., base station 108 or the like).

The components shown by FIG. 6 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 7:
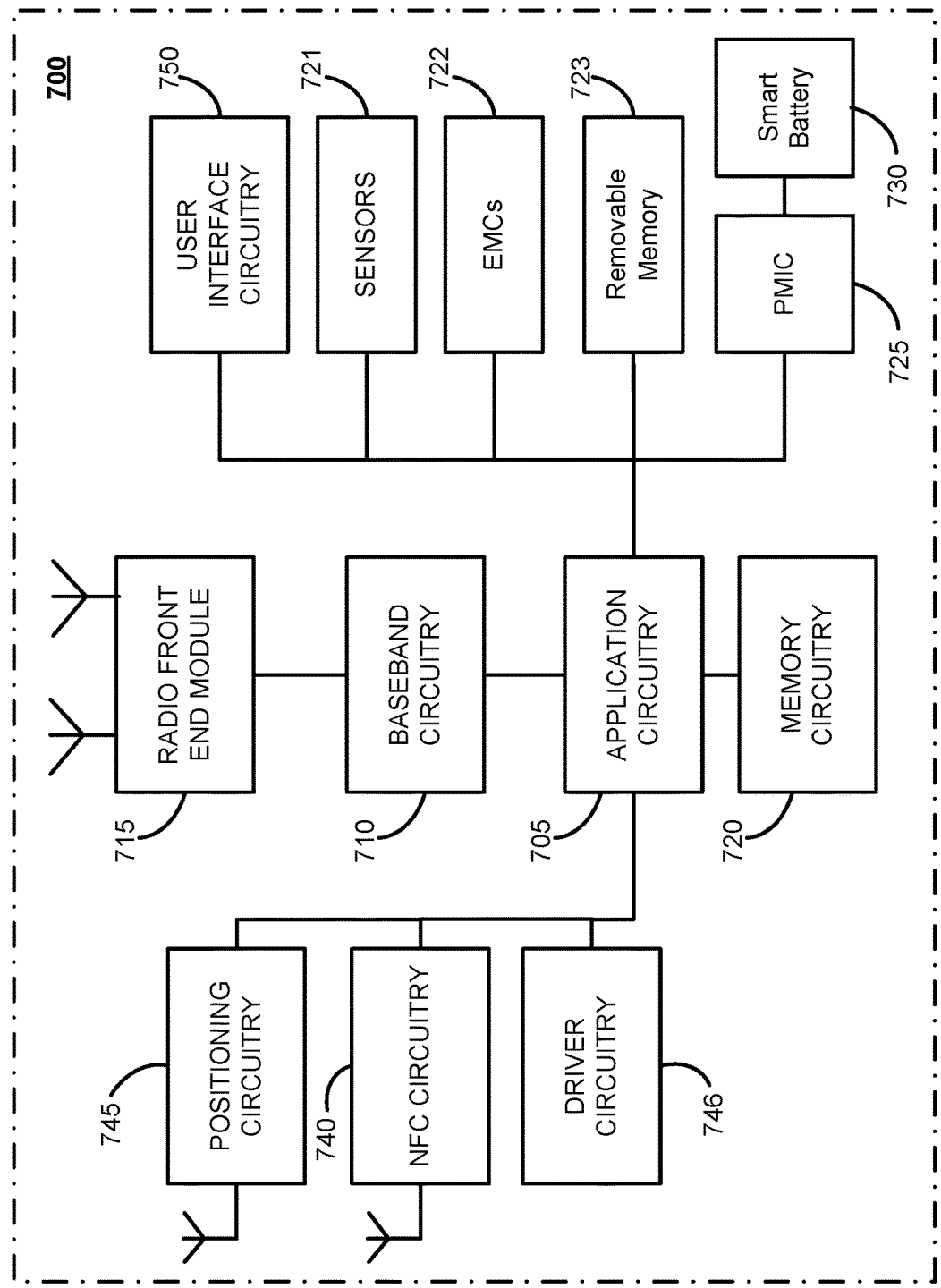
FIG. 7 depicts example components of a computer platform or device in accordance with various embodiments.

FIG. 7 illustrates an example of a platform 700 (or "device 700") in accordance with various embodiments. In embodiments, the computer platform 700 may be suitable for use as UE 104, base station 108, or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

The application circuitry 705 may include circuitry such as, but not limited to, single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input/output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 700. In some embodiments, processors of application circuitry 605/705 may process IP data packets received from an EPC or 5GC.

Application circuitry 705 may be or include a microprocessor, a multi-core processor, a multithreaded processor, an ultra-low voltage processor, an embedded processor, or other known processing element. In one example, the application circuitry 705 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 705 may also be one or more of Advanced Micro Devices (AMD) Ryzen® processor(s) or Accelerated Processing Units (APUs): A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry may include sensors 721, such as accelerometers, level sensors, flow sensors, temperature sensors, pressure sensors, barometric pressure sensors, and the like. The interface circuitry may be used to connect the platform 700 to electro-mechanical components (EMCs) 722, which may allow platform 700 to change its state, position, and/or orientation, or move or control a mechanism or system. The EMCs 722 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 may be configured to operate one or more EMCs 722 based on one or more captured events and/or instructions or control signals received from a service provider and/or various clients.

In some implementations, the interface circuitry may connect the platform 700 with positioning circuitry 745, which may be the same or similar as the positioning circuitry 645 discussed with regard to FIG. 6.

In some implementations, the interface circuitry may connect the platform 700 with Near-Field Communication (NFC) circuitry 740, which may include an NFC controller coupled with an antenna element and a processing device. The NFC circuitry 740 may be configured to read electronic tags and/or connect with another NFC-enabled device.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensors 721 and control and allow access to sensors 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in the UE 104.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC_Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, a power block may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touch-screens (e.g., Liquid Chyrstal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc Although not shown, the components of platform 700 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, a FlexRay system, or any number of other technologies. The bus may be a proprietary bus, for example, used in a SoC based system. Other bus systems may be included, such as an I2C interface, an SPI interface, point-to-point interfaces, and a power bus, among others.

Figure 8:
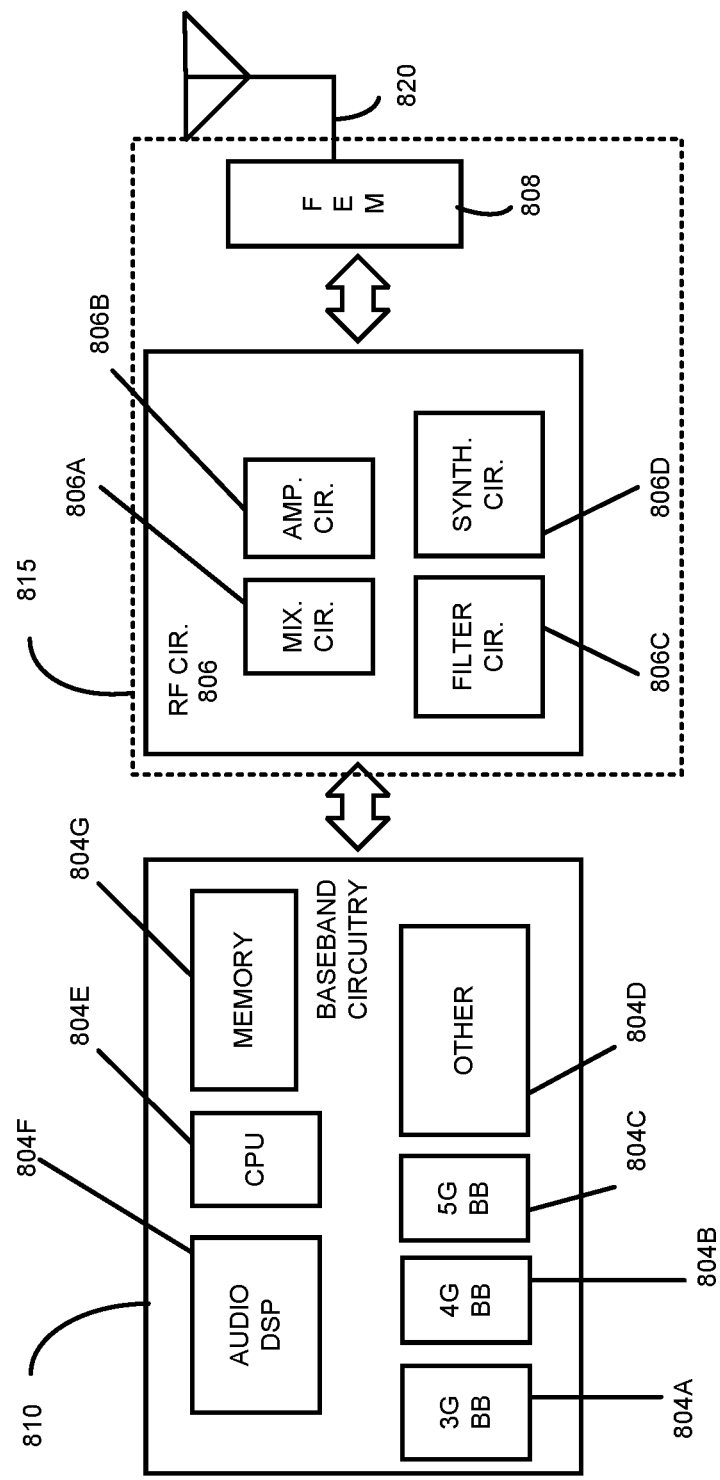
FIG. 8 depicts example components of baseband circuitry and radio frequency end modules in accordance with various embodiments.

FIG. 8 illustrates example components of baseband circuitry 610/710 and radio front end modules (RFEM) 615/715 in accordance with various embodiments. As shown, the RFEMs 615/715 may include Radio Frequency (RF) circuitry 806, front-end module (FEM) circuitry 808, one or more antennas 8111 coupled together at least as shown.

The baseband circuitry 610/710 may include circuitry such as, but not limited to, one or more single-core or multi-core processors. The baseband circuitry 610/710 may include one or more baseband processors or control logic to process baseband signals received from a receive signal path of the RF circuitry 806 and to generate baseband signals for a transmit signal path of the RF circuitry 806. Baseband processing circuitry 610/710 may interface with the application circuitry 605/705 for generation and processing of the baseband signals and for controlling operations of the RF circuitry 806. For example, in some embodiments, the baseband circuitry 610/710 may include a third generation (3G) baseband processor 804A, a 4G baseband processor 804B, a 5G baseband processor 804C, or other baseband processor(s) 804D for other existing generations, generations in development or to be developed in the future (e.g., second generation (2G), sixth generation (6G), etc.). The baseband circuitry 610/710 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 610/710 may include Fast-Fourier Transform (FFT), precoding, or constellation mapping/demapping functionality. In some embodiments, encoding/decoding circuitry of the baseband circuitry 610/710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 610/710 may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 610/710 and the application circuitry 605/705 may be implemented together such as, for example, on a system on a chip (SOC).

In some embodiments, the baseband circuitry 610/710 may provide for communication compatible with one or more radio technologies. For example, in some embodiments, the baseband circuitry 610/710 may support communication with an E-UTRAN or other WMAN, a WLAN, a WPAN. Embodiments in which the baseband circuitry 610/710 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 610/710. RF circuitry 806 may also include a transmit signal path, which may include circuitry to up-convert baseband signals provided by the baseband circuitry 610/710 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 610/710 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 610/710 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 610/710 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 610/710 or the application circuitry 605/705 depending on the desired output frequency. In some embodiments, a divider control input (e.g., N) may be determined from a look-up table based on a channel indicated by the application circuitry 605/705.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from one or more antennas 8111, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of the one or more antennas 8111. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 8111).

Processors of the application circuitry 605/705 and processors of the baseband circuitry 610/710 may be used to execute elements of one or more instances of a protocol stack. For example, processors of the baseband circuitry 610/710, alone or in combination, may be used execute Layer 3, Layer 2, or Layer 1 functionality, while processors of the application circuitry 605/705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 9:
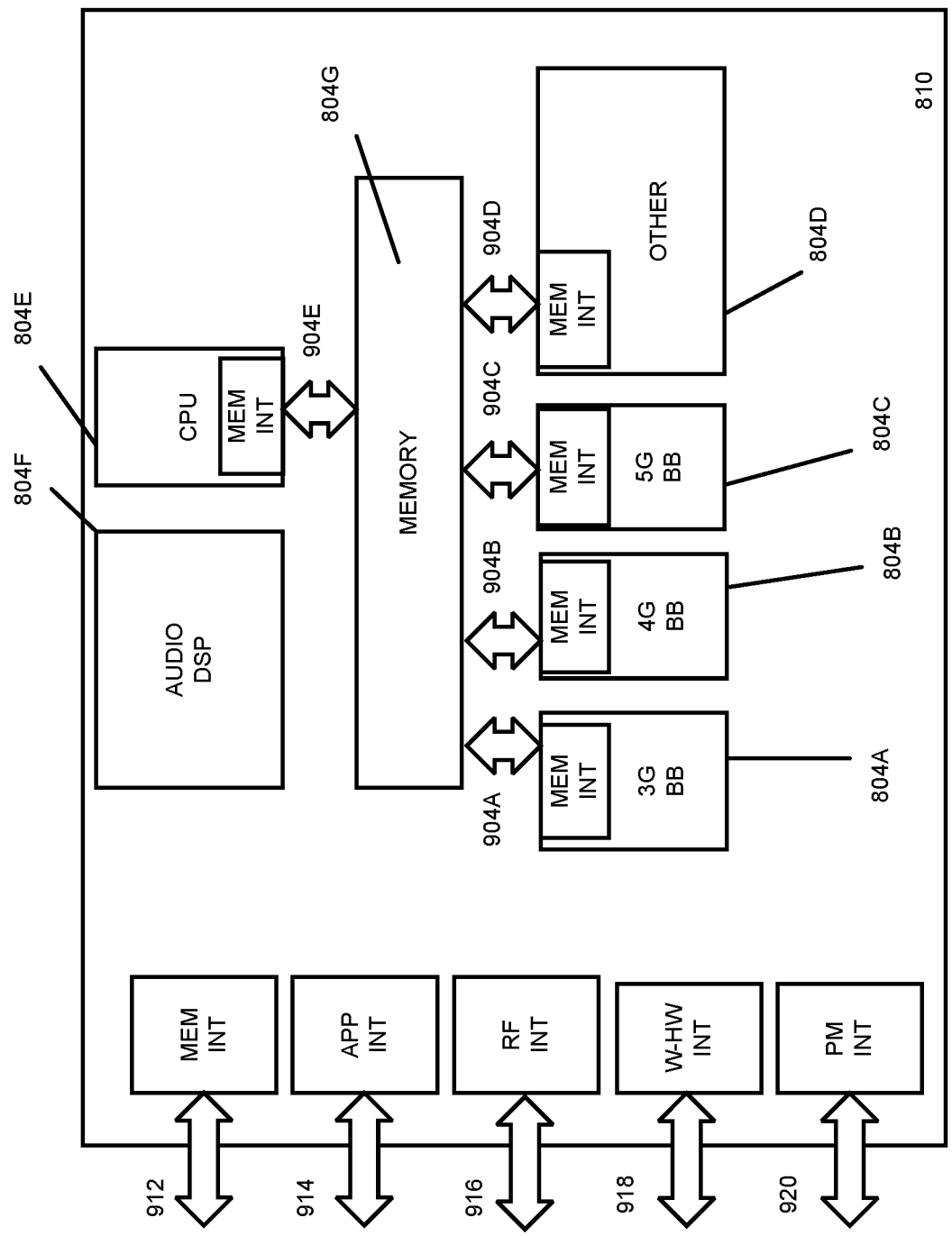
FIG. 9 depicts example interfaces of baseband circuitry in accordance with some embodiments.

FIG. 9 illustrates example interfaces of baseband circuitry in accordance with various embodiments. As discussed above, the baseband circuitry 610/710 of FIGS. 6, 7, and 8 may comprise processors 804A-804E and a memory 804G utilized by said processors. Each of the processors 804A-804E may include a memory interface, 904A-904E, respectively, to send/receive data to/from the memory 804G.

The baseband circuitry 610/710 may further include one or more interfaces to communicatively couple to other circuitries/devices, such as a memory interface 912 (e.g., an interface to send/receive data to/from memory external to the baseband circuitry 610/710), an application circuitry interface 914 (e.g., an interface to send/receive data to/from the application circuitry 605/705 of FIGS. 6-8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMIC 725.

Figure 10:
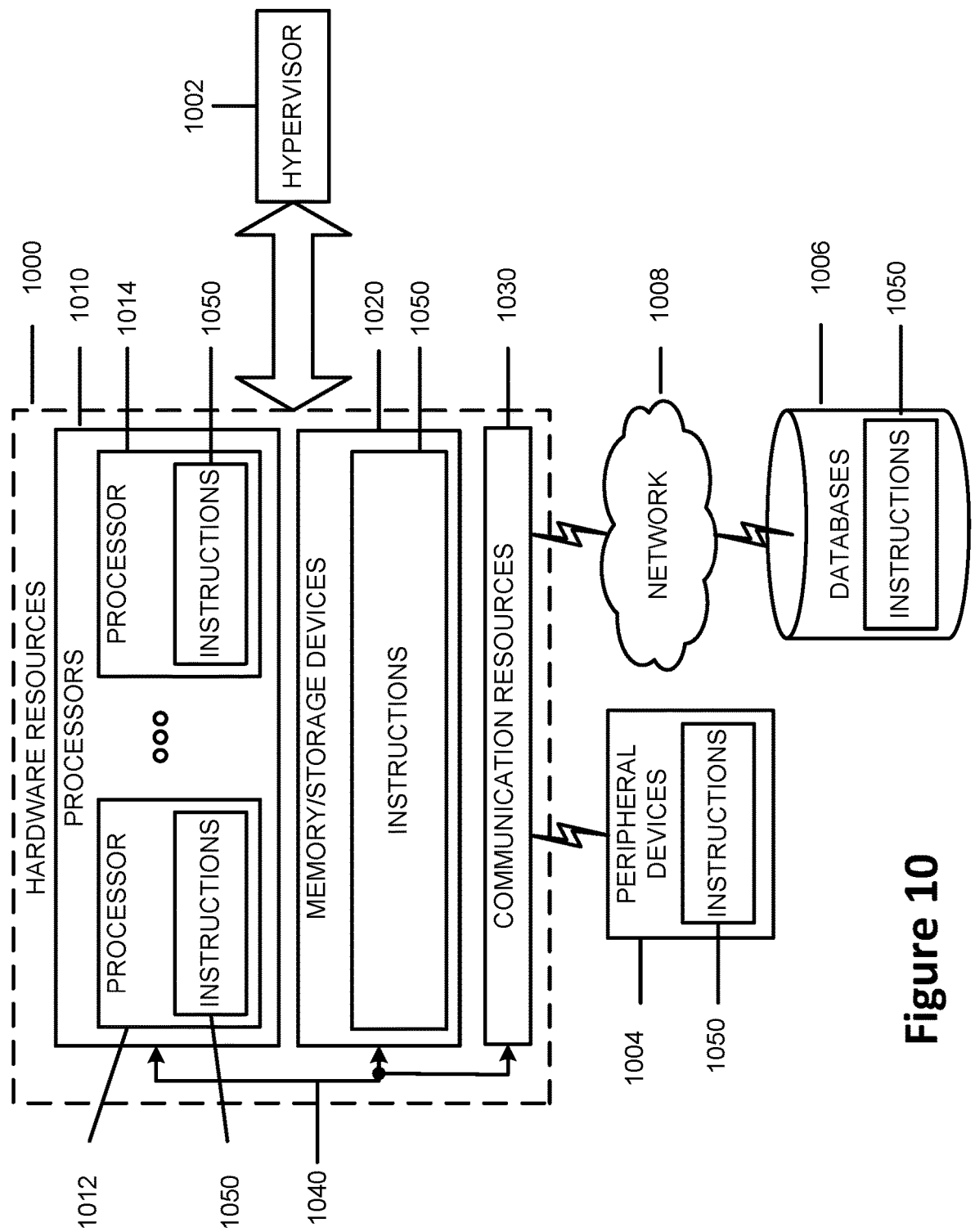
FIG. 10 is a block diagram illustrating components, according to some example embodiments, able to read instructions from a machine-readable or computer-readable medium (for example, a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1002 may be executed to provide an execution environment for one or more network slices/subslices to utilize the hardware resources 1000. A "virtualized resource" may refer to compute, storage, and/or network resources provided by virtualization infrastructure to an application, device, system, etc.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method comprising: generating downlink transmissions for unlicensed Internet of things (U-IoT) communication, the downlink transmissions to include an anchor segment on a first plurality of subframes and a data segment on a second plurality of subframes, wherein the anchor segment includes a narrow band reference signal (NRS) configured to be transmitted at a first transmit power by the base station, to facilitate time or frequency tracking; and causing transmission of the downlink frame for the U-IOT communication.

Example 2 may include the method of example 1 or some other example herein, further comprising causing transmission of a plurality of anchor segments, including the anchor segment, on an anchor channel; and causing transmission of a plurality of data segments, including the data segment, on a plurality of non-anchor channels based on a frequency hopping pattern.

Example 3 may include the method of example 1 or some other example herein, wherein the NRS is a first NRS and the data segment includes a second NRS configured to be transmitted at a second transmit power by the base station.

Example 4 may include the method of example 3 or some other example herein, wherein the first transmit power is equal to the second transmit power.

Example 5 may include the method of example 3 or some other example herein, further comprising: determining a peak-to-average-power ratio (PAPR) associated with a downlink channel; and boosting the second transmit power based on the PAPR.

Example 6 may include the method of example 3 or some other example herein, wherein the method further comprises: determining a quality estimate of a downlink channel; and boosting the second transmit power based on the quality estimate.

Example 7 may include the method of example 1 or some other example herein, further comprising: generating a configuration message to include an indication of the first transmit power: and causing the configuration message to be transmitted to a user equipment.

Example 8 may include a method comprising: determining power configuration information for narrow band reference signals (NRSs) to be transmitted by a base station that provides a narrow band Internet-of-things (NB IoT) cell in an unlicensed spectrum; receiving NRSs on anchor and data segments transmitted by the base station: and processing transmissions of the anchor and data segments based on receiving the NRSs.

Example 9 may include the method of example 8 or some other example herein, wherein determining the power configuration information comprises: receiving the power configuration information from the base station.

Example 10 may include the method of example 8 or some other example herein, wherein said determining the power configuration information comprises: determining a power of NRSs of the data segment are the same as a power of NRSs of the anchor segment.

Example 11 may include the method of example 8 or some other example herein, further comprising performing time/frequency tracking based on the received NRSs.

Example 12 may include the method of example 8 or some other example herein, wherein said determining the power configuration information comprises: processing a system information block message from the base station.

Example 13 may include the method of example 8 or some other example herein, wherein said determining the power configuration information comprises determining a default power configuration; and receiving the power configuration information in an update from the base station.

Example 14 may include the method of example 8 or some other example herein, wherein the power configuration information is a default power configuration.

Example 15 may include a method comprising accessing stored power configuration information to determine transmit powers associated with narrowband reference signals (NRSs) to be transmitted in a narrowband Internet-of-things (NB IoT) cell: receiving the NRSs in an anchor segment and data segments of a hyperframe of the NB IoT cell: and processing downlink transmissions from the anchor and data segments based on the received NRSs.

Example 16 may include the method of example 15 or some other example herein, further comprising receiving the power configuration information from the base station and storing the power configuration information in the memory.

Example 17 may include the method of example 16 or some other example herein, further comprising receiving the power configuration information from a system information block message.

Example 18 may include the method of example 15 or some other example herein, further comprising: determining a power of NRSs of the data segment are the same as a power of NRSs of the anchor segment.

Example 19 may include the method of example 15 or some other example herein, further comprising performing time/frequency tracking based on the received NRSs.

Example 20 may include the method of example 15 or some other example herein, wherein the stored power configuration information is a default power configuration or an updated power configuration.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A non-transitory computer-readable medium having instructions that, when executed by one or more processors, cause a base station to perform operations, the operations comprising:
    generating subframes for Unlicensed Internet of Things (U-IoT) communications, the subframes comprising an anchor segment on a first plurality of subframes, and a data segment on a second plurality of subframes, wherein the anchor segment includes a narrowband reference signal (NRS) configured to be transmitted in a minimum set of the first plurality of subframes at a first transmit power; and
    transmitting the first plurality of subframes and the second plurality of subframes.

2. The non-transitory computer-readable medium of claim 1, wherein the operations further comprise:
    transmitting a plurality of anchor segments, including the anchor segment, on an anchor channel; and
    transmitting a plurality of data segments, including the data segment, on a plurality of non-anchor channels based on a frequency hopping pattern.

3. The non-transitory computer-readable medium of claim 1, wherein the NRS is a first NRS and the data segment includes a second NRS configured to be transmitted at a second transmit power.

4. The non-transitory computer-readable medium of claim 3, wherein the first transmit power is equal to the second transmit power.

5. The non-transitory computer-readable medium of claim 3, wherein the operations further comprise:
    determining a peak-to-average-power ratio (PAPR) associated with a downlink channel; and
    boosting the second transmit power based at least on the PAPR.

6. The non-transitory computer-readable medium of claim 3, wherein the operations further comprise:
    determining a quality estimate of a downlink channel; and
    boosting the second transmit power based at least on the quality estimate.

7. The non-transitory computer-readable medium of claim 1, wherein the operations further comprise:
    generating a configuration message comprising an indication of the first transmit power; and
    transmitting the configuration message to a user equipment.

8. A non-transitory computer-readable medium having instructions that, when executed by one or more processors, cause a user equipment to perform operations, the operations comprising:
    determining power configuration information for narrowband reference signals (NRSs) to be transmitted by a base station that provides a narrowband Internet-of-Things (NB IoT) cell in an unlicensed spectrum; and
    based at least on the determination, receiving, from the base station, NRSs in an anchor segment and data segments, wherein a first NRS of the NRSs is received in a minimum set of a first plurality of subframes corresponding to the anchor segment, and wherein the data segments comprise a second plurality of subframes.

9. The non-transitory computer-readable medium of claim 8, wherein the determining power configuration information operation is based at least on power configuration information received from the base station.

10. The non-transitory computer-readable medium of claim 8, wherein the determining power configuration information operation comprises: determining that a power of a second NRS of the data segments is equal to a power of the first NRS of the anchor segment.

11. The non-transitory computer-readable medium of claim 8, wherein the operations further comprise: performing time or frequency tracking based at least on the NRSs.

12. The non-transitory computer-readable medium of claim 8, wherein the determining power configuration information operation comprises: processing a system information block message received from the base station.

13. The non-transitory computer-readable medium of claim 8, wherein the determining power configuration information operation comprises:
   determining a default power configuration; and
   receiving, from the base station, the power configuration information in an update.

14. The non-transitory computer-readable medium of claim 8, wherein the power configuration information is a default power configuration.

15. A user equipment, comprising:
   a memory; and
   processing circuitry coupled to the memory, configured to:
      access power configuration information stored in the memory;
      based at least on the access, determine transmit powers associated with narrowband reference signals (NRSs) to be received in a narrowband Internet-of-Things (NB IoT) cell;
      receive the NRSs in an anchor segment and data segments of a hyperframe of the NB IoT cell, wherein a first NRS of the NRSs is received in a minimum set of a first plurality of subframes corresponding to the anchor segment, and wherein the data segments comprise a second plurality of subframes; and
      process downlink transmissions from the anchor segment and the data segments based on the NRSs.

16. The user equipment of claim 15, wherein the processing circuitry is further configured to:
   receive the power configuration information from the base station; and
   store the power configuration information in the memory.

17. The user equipment of claim 16, wherein the processing circuitry is further configured to: receive the power configuration information from the base station via a system information block message.

18. The user equipment of claim 15, wherein the processing circuitry is further configured to: determine that a power of a second NRS of the data segments is equal to a power of the first NRS of the anchor segment.

19. The user equipment of claim 15, wherein the processing circuitry is further configured to: perform time or frequency tracking based at least on the NRSs, wherein the first NRS is received in a subframe (SF) #0 that does not contain a narrowband secondary synchronization signal (NSSS).

20. The user equipment of claim 15, wherein the power configuration information is a default power configuration or an updated power configuration.

* * * * *